United States Patent [19]
Kohonen

[11] Patent Number: 5,428,644
[45] Date of Patent: Jun. 27, 1995

[54] ADAPTIVE DETECTION METHOD AND DETECTOR FOR QUANTIZED SIGNALS

[75] Inventor: Teuvo Kohonen, Espoo, Finland

[73] Assignee: Oy Nokia AB, Helsinki, Finland

[21] Appl. No.: 74,359

[22] Filed: Jun. 10, 1993

[30] Foreign Application Priority Data

Jun. 12, 1992 [FI] Finland ................... 922750

[51] Int. Cl.⁶ .................. H03D 1/00; H04L 27/06
[52] U.S. Cl. ................. 375/340; 364/724.19;
375/232; 375/261; 375/346; 375/349
[58] Field of Search ............ 375/10, 11, 13, 14,
375/15, 17, 94, 39, 99, 102, 103; 364/724.19,
724.2

[56] References Cited

U.S. PATENT DOCUMENTS

| | | | |
|---|---|---|---|
| 4,905,254 | 2/1990 | Bergmans | 375/14 |
| 5,233,635 | 8/1993 | Henriksson et al. | 375/99 |
| 5,287,385 | 2/1994 | Sugawara et al. | 375/94 |

FOREIGN PATENT DOCUMENTS

WO89/08360 9/1989 WIPO .

OTHER PUBLICATIONS

Gerhard Rigoll, "Information Theory-Based Supervised Learning Methods for Self-Organizing Maps in Combination with Hidden Markov Modeling", IEEE 1991, pp. 65–68.

*Primary Examiner*—Stephen Chin
*Assistant Examiner*—Amanda T. Le
*Attorney, Agent, or Firm*—Finnegan, Henderson, Farabow, Garrett and Dunner

[57] ABSTRACT

The invention relates to an adaptive detection method and detector for detecting signal states of a received quantized signal using a set of reference vectors stored in a memory (11). According to the invention, the detector comprises sampling means (4) for sampling the received signal in a sliding time window; means (2) using a self-organizing map for calculating a first corrected set of reference vectors on the basis of the stored set of reference vectors used in the detection and samples of actual signal states received in the time window; means (3) employing the K-means method or the like for calculating a second corrected set of reference vectors on the basis of the first corrected set of reference vectors and the samples of the actual signal states; and means (9) for updating the set of reference vectors stored in the memory means (11) by the second corrected set of reference vectors.

8 Claims, 4 Drawing Sheets

ADAPTIVE DETECTION METHOD AND DETECTOR FOR QUANTIZED SIGNALS

FIELD OF THE INVENTION

The invention relates to an adaptive detection method for quantized signals with a finite number of signal states, said method comprising the steps of receiving a quantized signal; detecting the signal states of the received signal using a set of reference vectors stored in a memory; updating the stored set of reference vectors on the basis of samples of the actual signal states of the received signals.

BACKGROUND OF THE INVENTION

In the reception of quantized signals, the received signal states are detected by means of references representing predetermined reference states. These references are conventionally set to correspond to the ideal states of the quantized signal in question. A quantized signal may have these ideal states when it is generated, for example in the modulator of a transmitter. However, the transmission channel between a transmitter and a receiver typically introduces both linear and non-linear distortion on a signal, which distorts the signal states of a received signal so that it is difficult or impossible to detect them using an ideal reference set. Conventional attempts to obviate such distortion introduced by the transmission channel have included processing the received signal with a specific equalizer before it is supplied to the detector so that the signal to be detected would correspond to the original signal transmitted as accurately as possible.

The Applicant's previous patent application PCT/FI89/00037 discloses an adaptive detection method wherein the reference values used in the detection are continually corrected towards the actual received signal states, whereby the reference set can differ to a great extent from the ideal reference set. Patent application PCT/FI89/00037 gives examples of suitable methods for updating the reference values of an adaptive detector: the method employing a self-organizing map, and the K-means method. Of these, the K-means method is ideally unbiased with signals varying relatively regularly; in this method the references tend to follow the averages of actual signal states accurately. In other words, when the noise of a received signal and the variations of the signal levels are not very great, more accurate values are given for the references by the K-means method than by the map method. From the point of view of operation as a detector, the K-means method has however a disadvantageous property: when the signal levels of a received signal change rapidly and a certain signal state does not occur for a long time, the references may start to follow incorrect signal states. The K-means method cannot "recognize" this error and does not recover from it except by accident, most likely after a long time. Incorrect reference values naturally lead to complete failure of the detection. Under the above-mentioned conditions, where the noise of a received signal and/or variations in the signal level become great or sudden, the method based on a self-organizing map is clearly more suitable, as it can prevent the reference values from "escaping" and being assigned with incorrect signal states, and even rapidly restore the correct reference values. Patent application PCT/FI89/00037 suggests that under difficult conditions a solution be used where the map method is employed at the beginning of the reception for roughly finding the reference values, and where the K-means method is employed for the rest of the reception time in order to make the reference values follow up the received signal states as accurately as possible. If the detection fails later for some reason, the correct reference values can be restored again by using the map method temporarily. This known solution is thus a compromise where the (desirable and undesirable) properties of two different methods alternate with time; they are however not effective simultaneously at any span of time.

SUMMARY OF THE INVENTION

An object of the present invention is an adaptive detection method and detector where the reference values constantly follow the received signal states accurately without any possibility of becoming assigned with incorrect signal states.

This and other objects of the invention are achieved with an adaptive detection method for quantized signals with a finite number of signal states. The method comprises the steps of receiving a quantized signal, detecting the signal states of the received signal using a set of reference vectors stored in a memory, and updating the stored set of reference vectors on the basis of samples of the actual signal states of the received signals. The updating of the reference vectors comprises, calculating a first corrected set of reference vectors by a method employing a self-organizing map, on the basis of a stored set of reference vectors used in the detection and samples taken from actual received signal states in a predetermined time window, calculating a second corrected set of reference vectors by utilizing the K-means type method on the basis of the first corrected set of reference vectors and said samples of the actual signal states, updating the stored set of reference vectors used in the detection by said second corrected set of reference vectors, moving the time window in the time domain for sampling a new sample set from actual signal states of the received signal, and repeating the process steps for each new time window.

The basic idea of the invention is that the advantages of the method employing a self-organizing map and the K-means method (or the like) are combined by using these methods successively with each sample set sampled from a received signal state. In the first stage corrected reference vectors are formed from the present reference vectors using the map method, and in the second stage these reference vectors formed by the map method are processed with the K-means method, and the detector is updated by the reference vectors thus obtained. The first stage transfers the reference vectors rapidly to approximately correct positions, and the second stage fine adjusts the values of the reference vectors formed in the first stage. In this manner an adaptive detection method is achieved where the reference vectors follow the reception and signal states extremely accurately, but at the same time reliably and efficiently without the danger of "escape".

The map method can be either the original method which corrects after each signal state or a map method which is updated by sample sets and which is more suitable for use with the K-means method.

The invention also relates to an adaptive detector.

BRIEF DESCRIPTION OF THE DRAWINGS

In the following, the invention will be described in more detail by means of illustrative embodiments with reference to the accompanying drawings, in which.

DESCRIPTION OF THE PREFERRED EMBODIMENT

Figure 1:
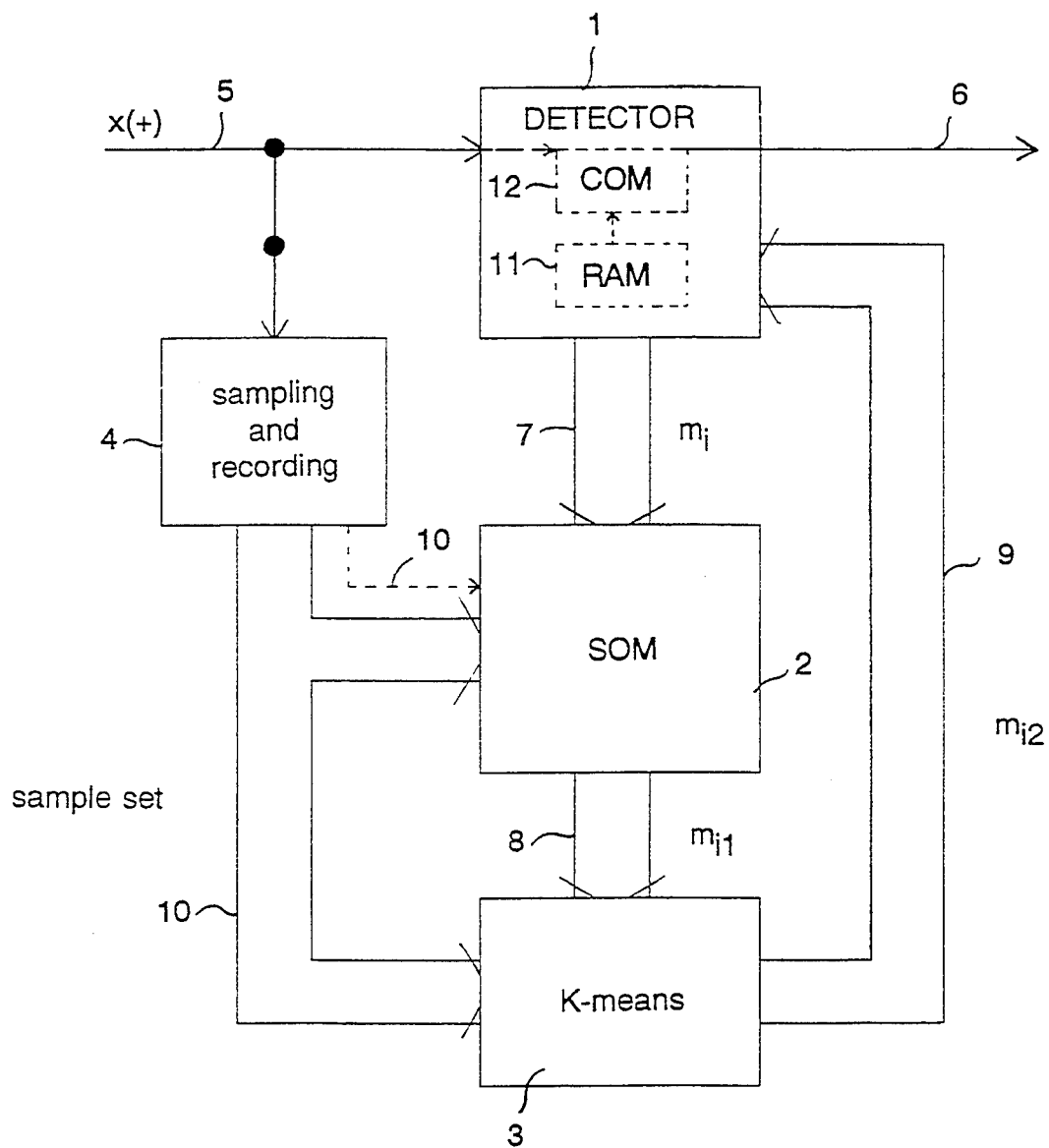
FIG. 1 shows a general block diagram of a detector of the invention.

In the primary embodiment of the adaptive detector according to the invention, shown in FIG. 1, a quantized signal with a finite number of possible signal states is received at the input of a detector 1 from the transmission channel or from a corresponding signal source either directly or through preceding receiver stages, e.g. processed with linear and/or non-linear equalizers. The quantized signal x(t) received may be, for example, a QAM (QUADRATURE-AMPLITUDE-MODULATION) signal, such as a 16-QAM signal with two signal components, I (in-phase) and Q (quadrature phase), the amplitudes and phases of the components defining 16 different signal states. The QAM is described, for example, in "Communication Systems: An introduction to signals and noise in electrical communication", A. Bruce Carlson, third edition, McGraw-Hill Book Company, New York, especially pages 542 to 555, which are incorporated herein by reference. The detector according to the invention can implement e.g. the data converter block of the receiver shown in FIG. 14.4-1 of the reference. The state of a received quantized signal x(t) at a particular moment t is detected in a detector block 1 by reference means 12, which compares the received signal state with a set of reference vectors $m_i$ stored in a memory 11 (e.g. random access memory RAM) and using a suitable criteria selects a reference vector closest to the received signal state as a detection result $m_c$, which is supplied to the output of the detection block 6. The detection block 1 can be implemented for each signal type x(t) to be detected as conventional detector circuitry in which there is reserved the possibility of updating reference vectors by storing them e.g. in the memory 11 instead of conventional fixed set values.

The x(t) received at the input 5 is also supplied to a sampling and recording block 4, which samples the signal states of the signal x(t) in a predetermined sliding time window and records the samples in a memory. Block 4 supplies the sample sets it has taken at intervals of said time window through a bus 10 to reference vector calculation blocks 2 and 3.

In addition, the detector 1 supplies the reference vectors $m_i$ utilized in the detection and stored in the memory 11 through a bus 7 to the calculation block 2, which forms a first corrected set $\{m_{i1}\}$ of reference vectors by the method based on a self organizing map and on the basis of the sample set received and a set of reference vectors, as will be described below.

The first corrected set $\{m_{i1}\}$ of reference vectors is further supplied through a bus 8 to the calculation block 3, which calculates a second corrected set $\{m_{i2}\}$ of reference vectors by the K-means method or the like on the basis of the sample set received and the first corrected set $\{m_{i1}\}$ of reference vectors, as will be described below. This second corrected reference vector $m_{i2}$ is supplied through a bus 9 to the detector 1 and recorded in the memory 11 as a new updated set $\{m_i\}$ of reference vectors. Thus a mechanism of pipeline type is formed for updating reference vectors $m_i$; the reference vectors $m_i$ stored in the memory 11 are corrected on the basis of signal samples sampled from a received signal x(t) in a sliding time window. The embodiment described above is applicable when the reference vectors mil corrected both in map block 2 and in block 3 are calculated by sample sets.

Patent application PCT/FI89/00037 discloses the theory and basic principles of detection effected by means of self-organizing maps and the K-means method, and also different alternative embodiments. The same principles apply to the detection according to the present invention, wherefore it is not necessary to describe them in greater detail in this application; PCT/FI89/00037 with its cross references is incorporated herein by reference. PCT/FI89/00037 discloses the basic methods in which the map method is used to correct a reference vector $m_c$ and its neighbours after each received signal state. If this basic method is used in block 2, block 4 can supply the samples one by one directly to block 2 as shown by a dashed line 10. The sample sets sampled by the sampling block 4 are then supplied merely to block 3. In other respects an alternative embodiment of this kind would function in the same way as the primary embodiment.

In the following, the operation of blocks 1, 2, 3 and 4 will be described in more detail with reference to flow diagrams 2, 3 and 4.

A set of reference or code book vectors $m_i$ generally known from vector quantization methods are used in block 1. Of this set of vectors, a reference vector $m_c$ closest to the signal vector x is selected in connection with the detection in accordance with equation (1)

$$c = \arg \min_i \{ \| x - m_i \| \} \qquad (1)$$

In this connection, vector refers to any one- or multi-dimensional representation of a parameter determining the state of a signal, such as level, amplitude, frequency, phase, etc., or their combination. There are as many vectors $m_i$ as there are different signal states i of the received signal x(t), and they are updated continually by the method of the invention in order for the highest possible identification accuracy to be maintained.

Figure 2:
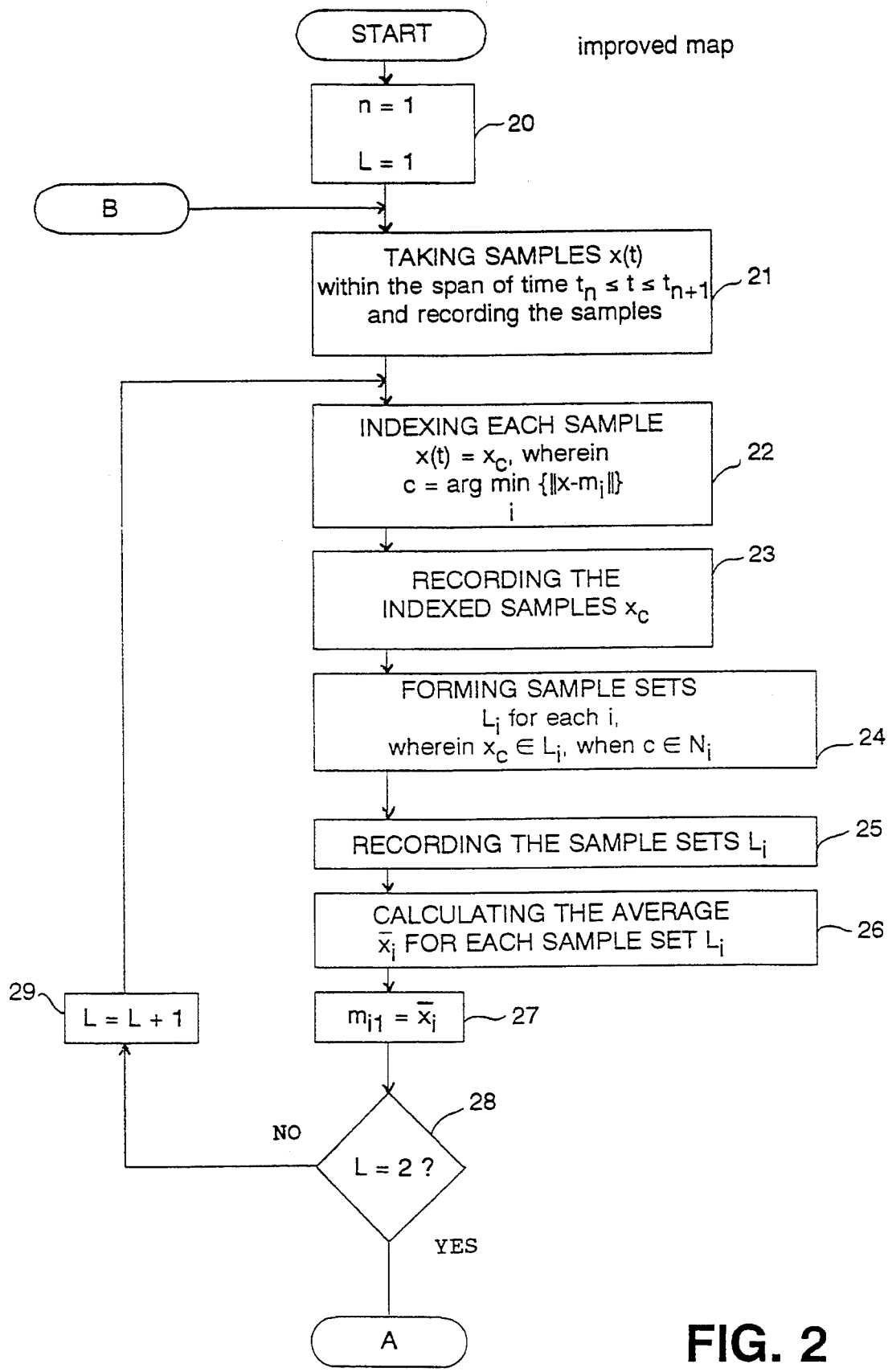
FIG. 2 is a flow diagram illustrating the operation of blocks 2 and 4 of FIG. 1.

In FIG. 2, a time window counter n and an iteration cycle counter L are set to value one (step 20). Thereafter block 4 of FIG. 1 samples a received signal x(t) within a certain span of time $t_n < t \leq t_{n+1}$ and records the signal samples obtained in an internal memory (step 21).

After sampling, the sample set $\{x(t)\}$ is supplied to map block 2, in which each sample x(t) is provided with an index c = c(t) according to formula (1). In other words, the index c assigned to each signal sample is the index of that vector of the set $m_i$ of vectors stored in the memory 11 which according to formula (1) would be selected as the detection result $m_c$ (step 22). Thereafter the indexed samples $x_c$ are recorded in the memory (step 23). In the map algorithm updated by sample sets, a sample set $L_i$ is collected for each signal state i from the signal samples sampled in a time window; the sample set $L_i$ includes all the samples x(t), or their copies, whose closest reference vector $m_c$ belongs to the set $N_i$ of neighbours of the reference vector $m_i$ indicated by the index i (step 24). The sample sets $L_i$ thus formed are thereafter recorded (step 25). The same sample x(t) can thus be included in several sample sets $L_i$. For each sample set the average $M_i$ of the samples of the set is subsequently calculated (step 26); these averages determine the first corrected set $\{m_{i1}\}$ of reference vectors (step 27). In step 28 it is checked whether the number of iteration cycles is as desired; if not, the iteration counter L is incremented by one (step 29), and the process returns to step 22. Thereafter process steps 22, 23, 24, 25, 26 and 27 are repeated using the first corrected set $\{m_{i1}\}$ of reference vectors formed in process step 22 during the previous iteration cycle. When it is found in step 28 that the desired number of iteration cycles have been effected, the process proceeds to step A in FIG. 3.

Figure 3:
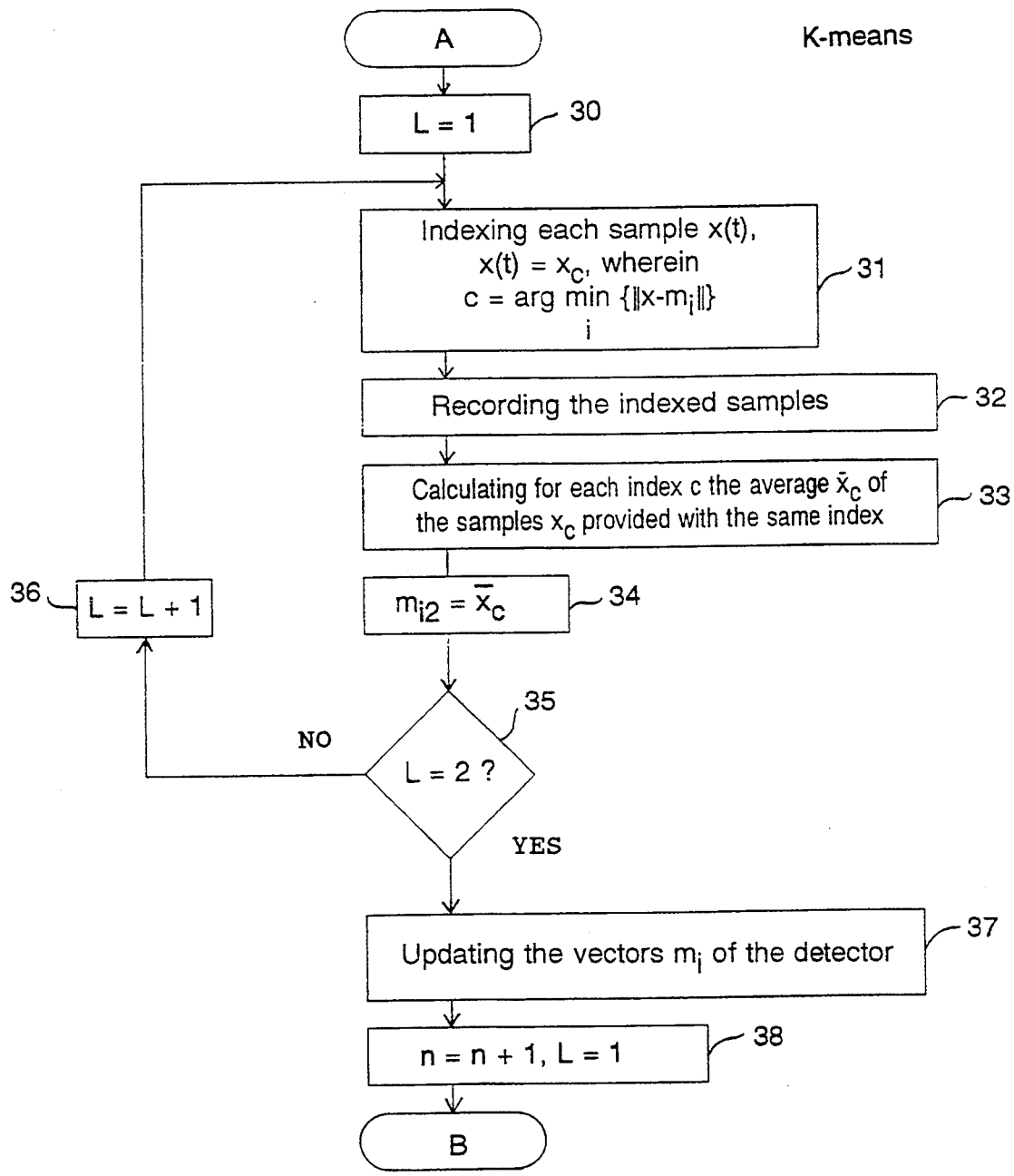
FIG. 3 is a flow diagram illustrating the operation of block 3 of FIG. 1 when the K-means method is used.

In FIG. 3, the iteration counter L is at first set to value one (step 30). Each sample x(t) of the sample set supplied from the sampling block 4 to block 3 is then indexed according to formula (1) by the index c (step 31) in the same manner as in process step 22 of FIG. 2, and the indexed samples are recorded (step 32). Thereafter separate averages $X_c$ are calculated for each index c from the samples provided with the same index c (step 33), these averages determining the second corrected set $\{m_{i2}\}$ of reference vectors (step 34). In step 35 it is checked whether the desired number of iteration cycles have been effected; if not, the iteration cycle counter L is incremented by one in step 36, and step 31 is returned to. Process steps 31 to 34 are then repeated with the same sample set using the second corrected set $\{m_{i2}\}$ of reference vectors formed during the previous iteration cycle as the starting point in process step 31. When the desired number of iteration cycles have been effected, step 35 is followed by step 37, where the set $\{m_i\}$ of reference vectors stored in the RAM 11 is updated by the second corrected set $\{m_{i2}\}$ of reference vectors formed by block 3. Thereafter the time window of constant length is slided forward in the time domain (step 38), and the process returns to step B of FIG. 2 for taking samples of the signal x(t) within a new span of time $t_n < t \leq t_{n+1}$, and a new cycle is started for updating the reference vectors.

Perhaps the most difficult problem involved in the use of map methods with quantized signal states is that although the different states have the same probability of occurrence on the average, there may in practice be rather long random gaps between the occurrences of a certain state. In such a case, no information is received for a long time of the direction in which a signal state is developing. Especially if this takes place with amplitudes corresponding to the peripheral states of the map, the method based on a self-organizing map may cause bias ("reduction") in the values of the reference levels as compared with the actual signal levels. Patent application No. PCT/FI89/00037 suggests a solution to this problem according to which the amplitude values of the peripheral signal states are linearly modified prior to training to such an extent that the bias in question is compensated for. Unfortunately such compensation can only be effected in an approximately normal situation, not e.g. when the signal levels vary to a great degree. In the following, a more efficient way of carrying out such compensation will be described.

Let us first examine a one-dimensional case. In order to be stable on the average, each of the reference levels $m_i$ should be in a "centre of gravity" of a so-called area of influence. The area of influence is defined as follows. The level closest to the received signal level is indicated by the index c. The reference level (vector) c and its closest neighbours (or if c is a peripheral reference level, the neighbouring level closest to it) form a set $N_c$ of indices. A correction is directed to all reference levels belonging to the set $N_c$ of indices. Accordingly, all the signal values capable of correcting a certain reference level form the area of influence of said reference level.

Figure 4:
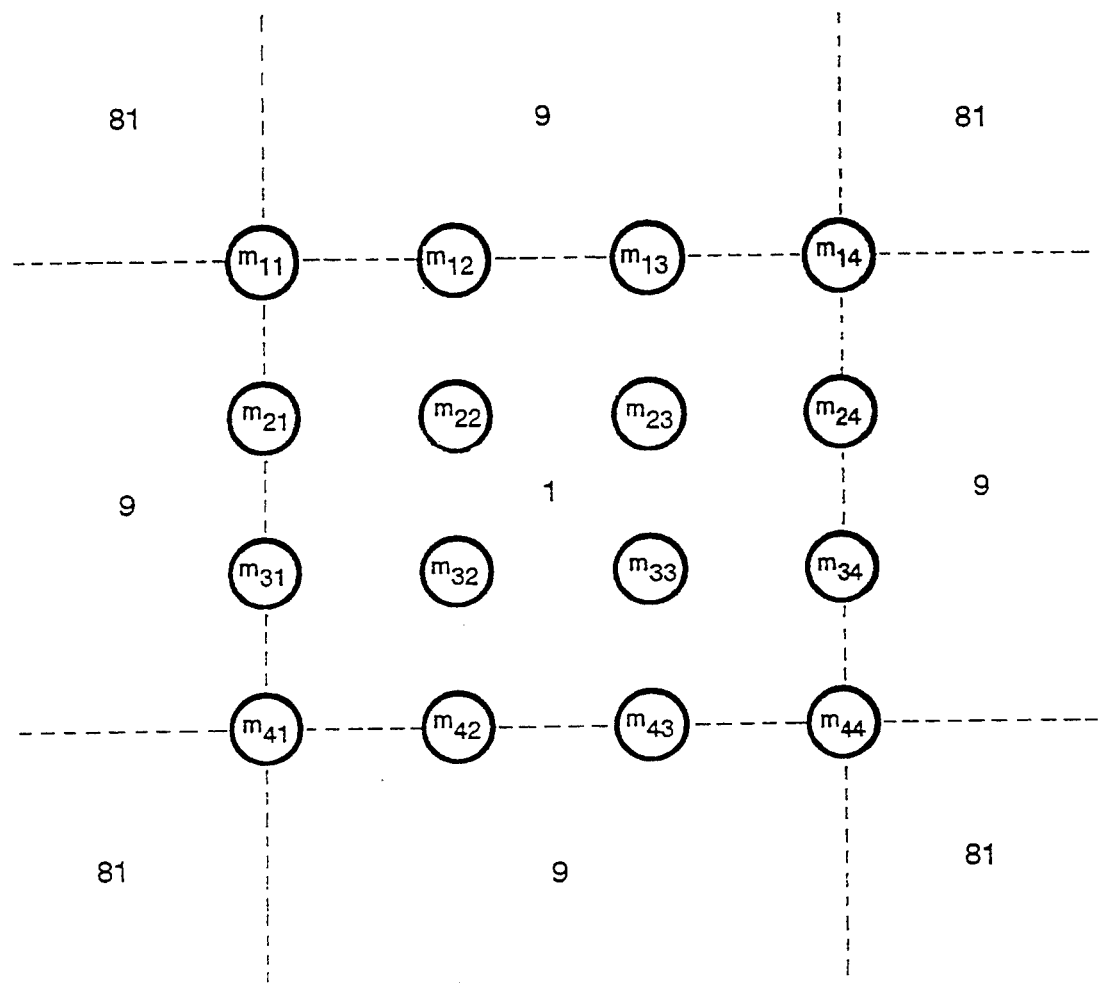
FIG. 4 shows a set of reference vectors for a 16-QAM-signal to illustrate the weighting of signal samples utilized in the improved map method of the invention.

According to the invention, the signal sample sampled by block 4 is provided with a conditional weight value during training in block 2 in such a manner that the weight is usually 1 but greater when the reference level $m_i$ closest to the signal is a peripheral reference level in the set of reference levels, and when the algorithm corrects this reference level (and not its neighbour), and when the level of the signal sample falls outside the entire set of reference levels (i.e. is below the lowest level or above the highest level). If the signal distribution were even within a certain time span, the signal levels would assume, when the conditional weight value 9 is used, at unbiased equidistant balance values representing the distribution. But if the signal samples have smaller dispersion around the reference levels, the optimum weight should be even greater. However, the accurate value of the weight is not of great significance; the most important thing is that the signal samples are separated correctly, and that a possible small residual error in the peripheral levels does not change the classification unless the noise is really high. Therefore the weight value 9 is of suitable magnitude. FIG. 4 illustrates a two-dimensional array of reference points suitable for a QAM signal and comprising four lines of four points (reference vectors m). In FIG. 4 a signal sample is always weighted by the weight coefficient 1 if the closest reference vector is in the middle, i.e. $m_{22}, m_{23}, m_{32}$ or $m_{33}$. A signal sample is weighted by the weight coefficient 9 when the closest reference vector is in a peripheral point, but not in a corner point, and when this or some other peripheral point (thus even a corner point) is corrected, and when the value of the signal sample falls outside the set of reference vectors. A signal sample is weighted by the weight coefficient 81 when, and only when, the closest reference vector is at a corner point, and when the reference vector in question is corrected, and when the value of the signal sample is in the "outer sector" of the corner point (in the area between the extensions of the side lines), as illustrated in FIG. 4.

If the original map algorithm disclosed in patent application PCT/FI89/00037 is used, the correction coefficient a of the weight value x must never be greater than one. Therefore the weight of both a peripheral and a corner point must not be higher than $1/\alpha$ even if this would cause bias. If the above-described training by sample sets is used for training the map, this restriction does, however, not exist.

The use of relative weight coefficients as described above has an effect only on step 22 of the flow diagram shown in FIG. 2. In step 22 each sample is weighted in connection with indexing by a weight coefficient selected in the manner described above. Thereafter sample sets $L_j$ are formed of these weighted samples in step 24, and the average of the sample sets $L_j$ is calculated in accordance with step 26.

In FIG. 1, block 4 can be implemented using any conventional sampling technique. The operations of blocks 2 and 3 can be implemented numerically, for example, by using digital signal processing architectures or analog circuits. The choice of technology depends on the accuracy required, computing speed and costs; in each specific case the decision is determined by the prevailing state of the art of different circuit technologies. The calculation of parameters can also be carried out by means of special circuits for neural calculation having a particularly high calculation capacity in signal processing. Such circuits are disclosed, for example, in the article "An Implementation of Kohonen's Self-Organizing Map on the Adaptive Solutions Neurocomputer", Dan Hammerstrom et al., Proceedings of the 1991 International Conference on Artificial Neural Networks (ICANN-91), Espoo, Finland, 24–28 Jun. 1991, and in "Analog VLSI and Neural Systems", Carver Mead, Addision-Wesley Publishing Company, Reading, Mass., 1989.

If other signal or data processing is carried out, e.g. by micro or signal processors, in the data transmission system in which this detection principle is applied, formula (1) and the adaptive systems and methods shown in FIGS. 1 to 3 for calculating parameters can be programmed in these processors.

The adaptive and self-correcting signal detection method of the invention is suitable for use in any data transmission where the nominal values of the signals to be transmitted at different moments define a finite number of discrete states.

The signals may transfer digital information directly, e.g. in data transmission within the device.

The method can be applied when digital signals or states are converted into analog magnitudes, transmitted as such, and thereafter analyzed, detected and coded into digital form by this method. One application is a cellular radio (mobile telephone), where speech or some other analog signal is first digitized by delta modulation and then converted into analog form (e.g. QAM), transmitted in this form, coded again into digital form, and reconstructed as speech.

The present invention is, however, not restricted to any particular modulation method or standard in data transmission, but it is generally intended for distinguishing of quantized states from each other.

The method may also be applied to optical signals or equipment reading digital signals from magnetic or optical memories.

The accompanying figures and the description relating thereto are intended merely to illustrate the present invention. In its details the method and detector of the invention can vary within the scope of the appended claims.

I claim:

1. An adaptive detection method for quantized signals with a finite number of signal states, said method comprising the steps of receiving a quantized signal, detecting the signal states of the received signal using a set of reference vectors stored in a memory, updating the stored set of reference vectors on the basis of samples of the actual signal states of the received signals, the updating of the reference vectors comprising a) calculating a first corrected set of reference vectors by a method employing a self-organizing map, on the basis of a stored set of reference vectors used in the detection and samples taken from actual received signal states in a predetermined time window, the calculation step comprising the sub-steps of a1) using as the starting point the present stored set of reference vectors used in the detection, a2) collecting a sample set for each reference vector, said sample set containing all the signal samples whose closest reference vector belongs to the set of neighbors of the first corrected set of reference vectors, a3) calculating for each reference vector the average of the collected sample set, a4) forming a first corrected set of reference vectors from said calculating average, of the collected sample sets, a5) repeating sub-steps a2), a3) and a4) for the same sample set with a desired number of iteration cycles using as the starting point in sub-step a2) the first corrected set of reference vectors formed during the previous iteration cycle, b) calculating a second corrected set of reference vectors by utilizing a K-means type method on the basis of the first corrected set of reference vectors and said samples of the actual signal states, c) updating the stored set of reference vectors used in the detection by said second corrected set of reference vectors, d) moving the time window in the time domain for sampling a new sample set from actual signal states of the received signal, and e) repeating process steps a), b), c) and d) for each new time window defined at step d).

2. A method according to claim 1 wherein process step a) the calculation of the first corrected set of reference vectors comprises at least two iteration cycles with a method employing a self-organizing map, and that in process step b) the calculation of the second corrected set of reference vectors comprises at least two iteration cycles with the K-means type method.

3. A method according to claim 1 or 2, wherein process step a2) comprises weighting of each sample by a conditional weight coefficient in such a manner that the weight coefficient is greater than one for the samples that are closest to any of the peripheral reference vectors in the set of reference vectors and fall outside the set of reference vectors, and that in process a3) said averages of sample sets are calculated using weighted signal samples.

4. A method according to claim 1, wherein in step b) the calculation of the second corrected set of reference vectors comprises at least two iteration cycles with the K-means type method.

5. A method according to claim 1, wherein sub-step a2) comprises weighting of each sample by a conditional weight coefficient in such a manner that the weight coefficient is greater than one for the samples that are closest to any of the peripheral reference vectors in the set of reference vectors and fall outside the set of reference vectors, and that in step a3) said averages of sample sets are calculated using weighted signal samples.

6. An adaptive detection method for quantized signals with a finite number of signal states, said method comprising the steps of receiving a quantized signal, detecting the signal states of the received signal using a set of reference vectors stored in a memory, updating the stored set of reference vectors on the basis of sample of the actual signal states of the received signals, the updating of the reference vectors comprising a) calculating a first corrected set of reference vectors by a method employing a self-organizing map, on the basis of a stored set of reference vectors used in the detection and samples taken from actual received signal states in a predetermined time window, b) calculating a second corrected set of reference vectors by utilizing a K-means type method on the basis of the first corrected set of reference vectors and said samples of the actual signal states, the calculation step comprising the substeps of b1) using as the starting point the first corrected set of reference vectors formed in step a), b2) providing each signal sample with an index of the closest reference vector in the set of reference vectors, b3) calculating for each index the average of the signal samples provided with the same index, b4) forming the second corrected set of reference vectors from said calculated average, b5) repeating sub-steps b2), b3) and b4) for the same sample set with a desired number of iteration cycles using as the starting point in sub-step b2) the second corrected set of reference vectors formed during the previous iteration cycle, c) updating the stored set of reference vectors used in the detection by said second corrected set of reference vectors, d) moving the time window in the time domain for sampling a new sample set from actual signal states of the received signal, and e) repeating steps a), b), c) and d) for each new time window defined at step d).

7. A method according to claim 6, wherein process step a) comprises the steps of a1) using as the starting point the present stored set of reference vectors used in the detection, a2) collecting a sample set for each reference vector, said sample set containing all the signal samples whose closest reference vector belongs to the set of neighbors of the first corrected set of reference vectors, a3) calculating for each reference vector the average of the collected sample set, a4) forming a first corrected set of reference vectors form said calculated average, of the collected sample sets, a5) repeating process steps a2), a3) and a4) for the same sample set with a desired number of iteration cycles using as the starting point in process step a2) the first corrected set of reference vectors formed during the previous iteration cycle.

8. A method according to claim 6, wherein in process step a) the calculation of the first corrected set of reference vectors comprises at least two iteration cycles with a method employing a self-organizing map.

* * * * *

UNITED STATES PATENT AND TRADEMARK OFFICE
CERTIFICATE OF CORRECTION

PATENT NO. : 5,428,644
DATED : June 27, 1995
INVENTOR(S) : TEUVO KOHONEN

It is certified that error appears in the above-indentified patent and that said Letters Patent is hereby corrected as shown below:

Claim 2, column 8, line 39, after "wherein", insert --in--.

Signed and Sealed this

Fourteenth Day of November, 1995

*Attest:*

BRUCE LEHMAN

*Attesting Officer*    *Commissioner of Patents and Trademarks*